US008495501B2

(12) United States Patent
Kadashevich et al.

(10) Patent No.: US 8,495,501 B2
(45) Date of Patent: Jul. 23, 2013

(54) MANAGING MULTIPLE AND/OR REPEATED OUT OF OFFICE NOTIFICATION PERIODS

(75) Inventors: A. Julie Kadashevich, Tyngsboro, MA (US); Murray W. Hurvitz, Needham, MA (US); Tarcio Constant, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 12/043,602

(22) Filed: Mar. 6, 2008

(65) Prior Publication Data
US 2009/0228806 A1    Sep. 10, 2009

(51) Int. Cl.
*G06F 3/00* (2006.01)
(52) U.S. Cl.
USPC ........... 715/747; 715/751; 715/752; 715/963; 705/7.15; 709/205; 709/206; 709/207; 709/224
(58) Field of Classification Search
USPC ................................................ 715/963, 747
See application file for complete search history.

(56) References Cited

U.S. PATENT DOCUMENTS

| | | | | |
|---|---|---|---|---|
| 6,988,128 B1 * | 1/2006 | Alexander et al. | ............ | 709/206 |
| 7,778,858 B1 * | 8/2010 | Daily et al. | ................ | 705/7.15 |
| 8,005,855 B2 * | 8/2011 | Kikin-Gil | ................ | 707/769 |
| 2004/0001108 A1 * | 1/2004 | Craig et al. | ................ | 345/839 |
| 2007/0260694 A1 * | 11/2007 | Boss et al. | ................ | 709/207 |
| 2008/0034305 A1 * | 2/2008 | Hawley et al. | ............ | 715/764 |
| 2008/0133302 A1 * | 6/2008 | Brauninger et al. | ........ | 705/8 |

OTHER PUBLICATIONS

Microsoft Outlook 2003, Microsoft, Copyright 2003, Screenshots.*

* cited by examiner

*Primary Examiner* — Alvin Tan
(74) *Attorney, Agent, or Firm* — David A. Dagg

(57) ABSTRACT

An out of office auto-response system that generates a calendaring user interface through which multiple out of office periods can be managed. The calendaring user interface enables a user to define, simultaneously view, and/or modify, multiple out of office periods during which auto-response messages will be generated. The out of office periods of the disclosed system are manageable as a specific type of calendar entries, and/or as a settable attribute of various types of calendar entries (e.g. vacation type calendar entries, meeting type calendar entries, etc.). The system generates user interface objects that allow a user to define an out of office period as repeated. The repeated office action may be defined as repeated a user-specified number of times, and over a user-specified interval, e.g. daily, weekly, monthly, yearly, etc.

19 Claims, 5 Drawing Sheets

MANAGING MULTIPLE AND/OR REPEATED OUT OF OFFICE NOTIFICATION PERIODS

FIELD OF THE INVENTION

The disclosed system relates generally to out of office notification systems, and more specifically to a mechanism for managing multiple and/or repeated out of office notification periods.

BACKGROUND OF THE INVENTION

As it is generally known, contemporary used electronic mail systems often include some kind of auto-responder system, typically referred to as an "out of office" feature, and/or sometimes as an "away auto-responder" or "vacation auto-responder". In existing systems, the out of office mechanism is integral to the electronic mail system, and allows the user to specify a range of dates during which they will be out of the office. Existing systems then cause the electronic mail system to automatically respond to messages received during the specified dates. The range of dates that the user can specify for the out of office auto-response period can be at any point in the future. However, a significant shortcoming of existing systems is the lack of any way for a user to set up more than one out of office period at a time. The out of office period is not treated as a calendar entry, and is not visible to the user through their electronic calendaring system, making it difficult to plan meetings and activities.

Thus it would be desirable to have a new system for managing out of office periods that allows a user to set up more than one out of office period at a time, and that also provides integration of out of office periods into the user's electronic calendaring system and user interface.

SUMMARY OF THE INVENTION

To address the above described and other shortcomings of existing systems, a new out of office auto-response system is disclosed. The new system generates a calendaring user interface through which multiple out of office periods can be managed. The calendaring user interface of the disclosed system enables a user to define, simultaneously view, and/or modify, multiple out of office periods during which auto-response messages will be generated. The out of office periods of the disclosed system are manageable as a specific type of calendar entries, and/or as a settable attribute of various types of calendar entries (e.g. vacation type calendar entries, meeting type calendar entries, etc.).

The disclosed system further generates user interface objects that allow the user to define an out of office period as repeated. A repeated office action is automatically repeated a user-specified number of times or indefinitely, based on a user-specified interval, e.g. daily, weekly, monthly, yearly, etc. The out of office time periods can also be individually specified on a non-repeating basis, e.g. for a one week period in the current month, a two day period in the following month, etc.

Thus there is disclosed a system for managing out of office periods that allows a user to set up more than one out of office period at a time, that includes automatically repeated out of office periods, and that provides integration of out of office notification periods into the user's electronic calendaring system and user interface as calendar entries.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
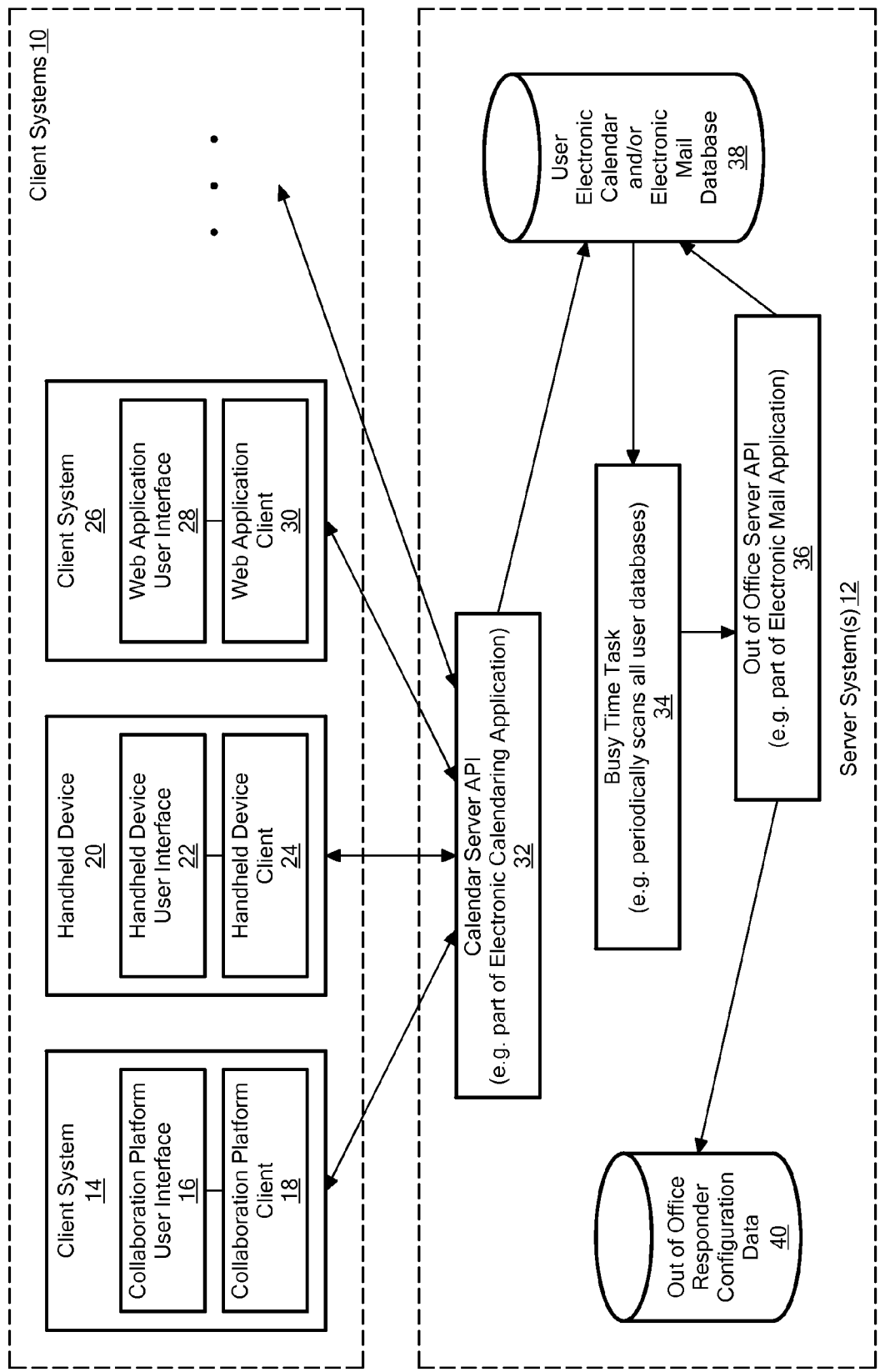
FIG. 1 is a block diagram showing components in an illustrative embodiment of the disclosed system.

As shown in FIG. 1, in an illustrative embodiment of the disclosed system, examples of Client Systems 10 include a Client System 14 having a Collaboration Platform Client 18 that generates a Collaboration Platform User Interface 16, a Handheld Device 20 having a Handheld Device Client 24 that generates a Handheld Device User Interface 22, and a Client System 26 having a Web Application Client 30 that generates a Web Application User Interface 28. Server System(s) 12 include a Calendar Server API (Application Programming Interface) 32, a Busy Time Task 34, and an Out of Office Server API 36. In one embodiment, the Calendar Server API 32 may be part of and/or associated with an electronic calendaring application server or the like, and the Out of Office Server API 36 may be part of and/or associate with an electronic mail application server. Further in the illustrative embodiment of FIG. 1, Server System(s) 12 includes a User Electronic Calendar and/or Electronic Mail Database 38 storing electronic calendar user data (e.g. calendar entries and the like) and/or electronic mail user data (e.g. messages, settings, etc.) for users, such as users of Client Systems 10. Further in the illustrative embodiment of FIG. 1, an Out of Office Responder Configuration Database 40 stores data related to turning on and turning off automatic responses for specific users. While the Out of Office Server API 36 is shown in FIG. 1 as logically separate from the Busy Time Task 34, these components may alternatively both be embodied within a single task or process.

During operation of the embodiment shown in FIG. 1, the disclosed system can be invoked from a variety of types of applications, such as client/server based applications, shown for purposes of illustration in FIG. 1 by the Collaboration Platform Client 18, hand-held device applications, shown for purposes of illustration in FIG. 1 by the Handheld Device Client 24, and/or Web applications, shown for purposes of illustration in FIG. 1 by Web Application Client 30. The invoking applications call into the Calendar Server API 32, which creates the herein disclosed "out of office" type of calendar entries. Calls from the invoking applications include the start and end dates and times of calendar entries ("out of office" calendar entries) for time periods ("out of office" periods) during which auto-response messages are generated, indications of whether specific out of office entries are to be repeated, the frequency at which specific out of office entries are to be repeated, the number of times specific out of office entries are to be repeated, and various other values used to set up the out of office calendar entries in the User Electronic Calendar and/or Electronic Mail Database 38.

In response to such calls from invoking applications, the Calendar Server API 32 creates the disclosed out of office calendar entries, and stores them into the User Electronic Calendar and/or Electronic Mail Database 38, which may also include other types of calendar entries, and/or electronic mail messages and/or settings associated with electronic calendar and/or electronic mail user files.

Each of the disclosed out of office calendar entries stored by the Calendar Server API 32 into the User Electronic Calendar and/or Electronic Mail Database 38 may include various specialized user-defined entry characteristics to be applied to the corresponding out of office period, e.g. as passed from an invoking application to the Calendar Server API 32. Examples of such user-defined out of office entry characteristics may include, without limitation, one or more out of office messages to be automatically sent as responses to electronic mail messages received for a user during the corresponding out of office period, a list of other users to whom out of office messages are not to be sent during the corresponding out of office period, a subject line to be included with the out of office responses generated during the out of office period, electronic mail addresses from which messages are to be ignored during the out of office period, and/or any other specific setting or configuration information required to provide out of office messages for a user during the out of office period corresponding to the out of office calendar entry.

In one embodiment, out of office calendar entry objects advantageously inherit behaviors and/or attributes from a more general class or classes of calendar entry objects, such as support for repeated calendar entries, and/or visibility within the electronic calendar user interface.

The illustrative embodiment of FIG. 1 further includes a server task responsible for monitoring calendar entries for all users, shown as the Busy Time Task 34. The Busy Time Task 34 has responsibility for turning on and/or turning off an out of office responder task or process that generates out of office response messages for received electronic mail messages during out of office periods. The Busy Time Task 34 periodically scans the User Electronic Calendar and/or Electronic Mail Database 38 (e.g. at least once a day), and is notified of all updates to the User Electronic Calendar and/or Electronic Mail Database 38. Additionally, users are provided with user interface options to manually over-ride out of office entry settings in the User Electronic Calendar and/or Electronic Mail Database 38, for example to end an out of office period before its originally scheduled end time and date, as may be desirable in the case where a user has returned from a meeting and/or vacation prior to a previously entered end time and date.

In one embodiment, the User Electronic Calendar and/or Electronic Mail Database 38 includes flags that are set to mark the beginning and end of each out of office period. If the Busy Time Task 34 detects a flag or the like that is set to indicate the beginning of an out of office period on the current day, the Busy Time Task 34 calls the Out of Office Server API 36. The Out of Office Server API 36 then starts the out of office auto-responder for the out of office period. For example, the Out of Office Server API 36 may be part of an electronic mail server or the like. In such an embodiment, the Out of Office Server API 36 controls the automatic generation of response messages during out of office periods by modifying the contents of Out of Office Responder Configuration Data 40, which controls operation of the electronic mail system auto-responder task or process.

If notification of an update to or creation of an out of office entry is received for an out of office period that does not begin and/or end on the current day, the Busy Time Task 34 ignores the notification, since the modification to the User Electronic Calendar and/or Electronic Mail Database 38 will be detected during subsequent periodic scanning performed by the Busy Time Task 34. In this way the disclosed system prevents the auto-responder within the electronic mail system from having to check the User Electronic Calendar and/or Electronic Mail Database 38 for each received message to determine whether an auto-response message should be generated.

In one embodiment, the electronic mail system automatically turns off the auto-responder at the end of each out of office period without further intervention by the Busy Time Task 34, e.g. based on settings provided in the Out of Office Responder Configuration Data 40 by the Busy Time Task 34.

The Client Systems 10 of FIG. 1 may be any specific type of computer systems and/or intelligent electronic devices, such as desktop, laptop, or palmtop computer systems, and/or personal digital assistant, cell phone, or other electronic devices. The Client Systems 10 each include or control display devices capable of displaying a graphical user interface (e.g. including Collaboration Platform User Interface 16, Handheld Device User Interface 22, and Web Application User Interface 28) to a respective local user, such as a liquid crystal display (LCD), cathode ray tube (CRT), interferometric modulator display (IMOD), light emitting diode (LED), or the like.

Those skilled in the art will further recognize that the Collaboration Platform Client 18, Handheld Device Client 24, Web Application Client 30, Calendar Server API 32, Busy Time Task 34 and/or Out of Office Server API 36 of FIG. 1 may be embodied using software or firmware, such as computer application program code, operating system program code, or middleware, and/or wholly or partly using digital hardware components, such as application specific integrated circuits (ASICs), field-programmable gate arrays (FPGAs), and the like, and/or combinations of hardware and/or software or firmware.

Those skilled in the art will further recognize that the Client Systems 10 and Server System(s) 12 of FIG. 1 may each include one or more processors, and program storage, such as memory, for storing program code executable on such processors, as well as input/output devices and/or interfaces. In the example of FIG. 1, the Client Systems 10 and Server System(s) 12 are interconnected through a data communication network (e.g. the Internet, a Local Area Network, etc.) using one or more of such input/output devices or interfaces, and through which may further be provided communication to a number of other client systems and/or remote server systems.

While for purposes of concise illustration a limited number of client systems are shown in FIG. 1, the disclosed system is not limited to any specific number of client systems. Moreover, while certain functions are described as being performed in the Client Systems 10 and in the Server System(s) 12, the disclosed system is not limited to any specific configuration or implementation in that regard. Accordingly, operations described as occurring in the Client Systems 10 may alternatively be performed in the Server System(s) 12, and vice versa. In addition, while the illustrative embodiment of FIG. 1 is implemented in a client-server architecture, the disclosed system is not limited to such an embodiment, and may alternatively be embodied using any other specific type of system architecture that may be appropriate and/or advantageous for a given implementation.

Figure 2:
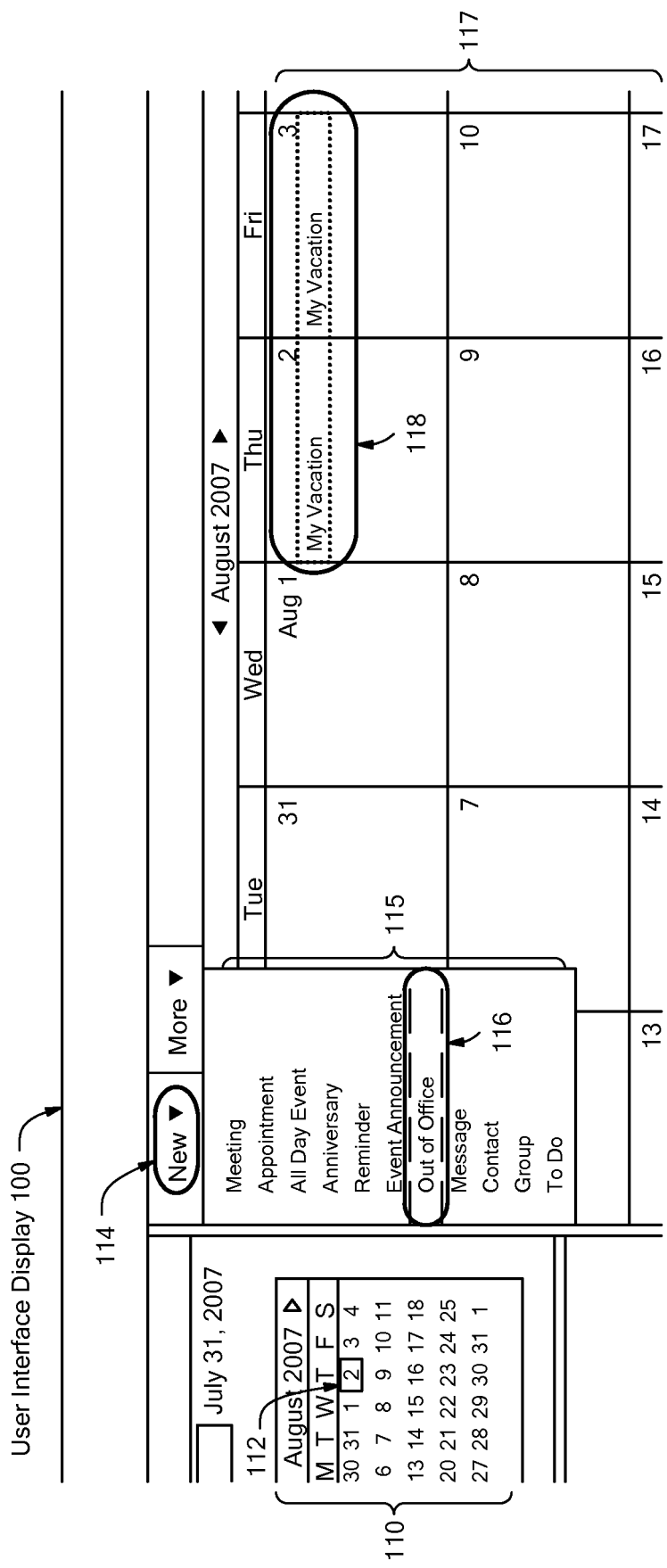
FIG. 2 is a simplified screen shot showing a first user interface display generated by an illustrative embodiment of the disclosed system.

FIG. 2 is a simplified screen shot showing a portion of a User Interface Display 100 generated by an illustrative embodiment to allow a user to conveniently define one or more out of office calendar entries. The User Interface Display 100 is, for example, provided as part of the Collaboration Platform User Interface 16, Handheld Device User Interface 22, and/or Web Application User Interface 28 shown in FIG. 1. As shown in FIG. 2, the User Interface Display 100 includes a graphical button 114 that the user clicks on to create a new calendar entry. In response to the user clicking on the button 114, the disclosed system generates a pull down menu 115 from which the user can select a calendar entry type for the new calendar entry. The pull down menu 115 includes the disclosed "Out of Office" calendar entry type 116.

The User Interface Display 100 further includes a calendar formatted user interface object 110 in which each date is selectable by mouse click. The user can select a start date for the new Out of Office calendar entry by clicking on a date within the calendar, such as date 112 (i.e. Aug. 2, 2007). A newly defined calendar entry 118 is also shown in a larger view 117 of the currently selected month of August, 2007, spanning both Aug. 2-3, 2007.

As also shown in FIG. 2, Out of Office calendar entries may be labeled specifically to indicate a reason that the user is away from the office. For example, the Out of Office calendar entry 118 is labeled as "My Vacation", indicating that the user is on vacation during that particular out of office period. Other specific labels may be alternatively selected or expressly entered by the user at the time out of office entries are created, such as "Meeting", "Appointment", "Conference", etc.

The calendar formatted portion 117 of the User Interface Display 100 conveniently displays out of office calendar entries for multiple time periods that the user is going to be away from the office. The calendar entries for out of office time periods can be presented to show full or partial days, e.g. by shading portions of the relevant days and/or displaying start and end times. While the calendar formatted user interface display objects 110 and 117 have a format in which each week of the month is a single row, any other appropriate calendar format may be used in the alternative.

Figure 3:
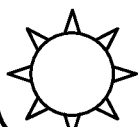
FIG. 3 is a simplified screen shot showing a second user interface display generated by an illustrative embodiment of the disclosed system.

FIG. 3 is a simplified screen shot showing a portion of a User Interface Display 150 generated by an illustrative embodiment of the disclosed system to allow a user to conveniently define one or more of the disclosed out of office calendar entries. The User Interface Display 150 is, for example, provided as part of the Collaboration Platform User Interface 16, Handheld Device User Interface 22, and/or Web Application User Interface 28 shown in FIG. 1.

As shown in FIG. 3, the User Interface Display 150 includes Default Calendar Options 152 that allow the user to define a new out of office calendar entry. A pull down menu 154 is provided to allow the user to select a specific type of calendar entry to be added. In an alternative embodiment, the pull down menu enables the user to set the desired label for the out of office entry currently being defined. A period definition area 158 allows the user to select a starting date 162, starting time 164, ending date 166, and ending time for the out of office entry. An alternate notification area 172 allows the user to define one or more out of office notification messages to be automatically generated as responses to messages received for the user during the out of office period for the entry. A display area 156 displays multiple out of office entries in a calendar format, e.g. where each currently defined out of office entry is displayed within a calendar representation of the month in which it is defined. For example, in the example of FIG. 3, the user has a first out of office entry 159 defined for May 27-31. Accordingly, the area of the calendar representing the dates May 27-31 is shaded to provide visual indication of the calendar entry. Any specific visual indication (e.g. special color, bolding, etc.) may be used in the alternative to visually indicate the out of office calendar entries.

A second out of office entry 160 is also displayed within a calendar representation of the month of August, 2007. The out of office entry 160 spans the days August 5-11, so those days are shaded in the calendar representation of August, 2007. When the user finishes defining the out of office calendar entry currently being worked on, the new entry is also added to the display area 156.

In the case where the user defines an out of office entry as repeating, repetitions of the out of office entry are displayed in the display area 156 for a number of months. For example, if the user has defined an out of office period that is repeated on each Thursday of every week indefinitely, the display area 156 would show each Thursday as shaded for each week of each month displayed in the display area 156.

In an alternative embodiment, an out of office characteristic or attribute can be associated with calendar entries of various types (e.g. meetings, vacations, etc.). In such an alternative embodiment, the disclosed system operates to trigger out of office response message generation for a user during any calendar entry for which the out of office attribute or characteristic is enabled or set. The user can accordingly cause the out of office characteristic or attribute to be enabled or set for any given calendar entry, for example by clicking or otherwise selecting an appropriately labeled (e.g. "Generate Auto-Response E-mail Messages During Entry" or the like) graphical button or the like provided in an alternative embodiment of the User Interface Display 150. Clicking on the button would cause the out of office characteristic or attribute to be enabled or set for a currently selected calendar entry of any specific type.

Figure 4:
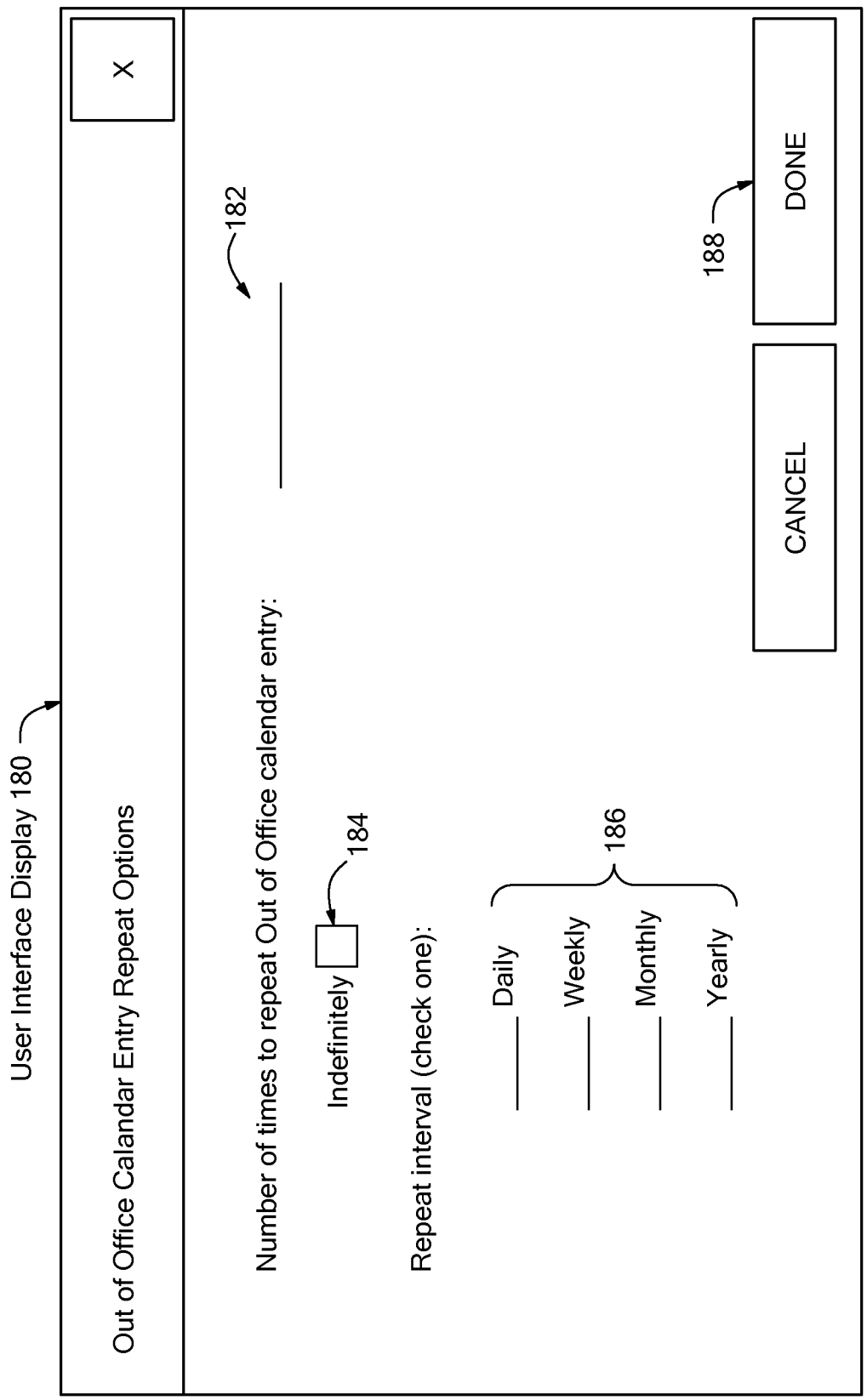
FIG. 4 is a simplified screen shot showing a third user interface display generated by an illustrative embodiment of the disclosed system.

FIG. 4 is a simplified screen shot showing a User Interface Display 180 generated by an illustrative embodiment of the disclosed system to allow a user to set repeat parameter values for a currently selected out of office calendar entry. The User Interface Display 180 is, for example, displayed as part of the Collaboration Platform User Interface 16, Handheld Device User Interface 22, and/or Web Application User Interface 28 shown in FIG. 1. The User Interface Display 180 may, for example, be displayed to the user in response to the user clicking or otherwise selecting an appropriately labeled (e.g. "Repeat Calendar Entry") graphical button, menu option or the like contained in an alternative embodiment of the User Interface Display 150 of FIG. 3.

As shown in FIG. 4, the User Interface Display 180 includes a field 182 into which the user can enter the number of times a currently selected out of office calendar entry is to be repeated, and a check box 184 that allows the user to indicate that the currently selected out of office calendar entry is to be repeated indefinitely. A set of selectable options 186 allows the user to select a desired repeat interval. After the user has selected the desired repeat parameter values, clicking on the Done button 188 causes the selected values to be associated with the current out of office calendar entry.

Figure 5:
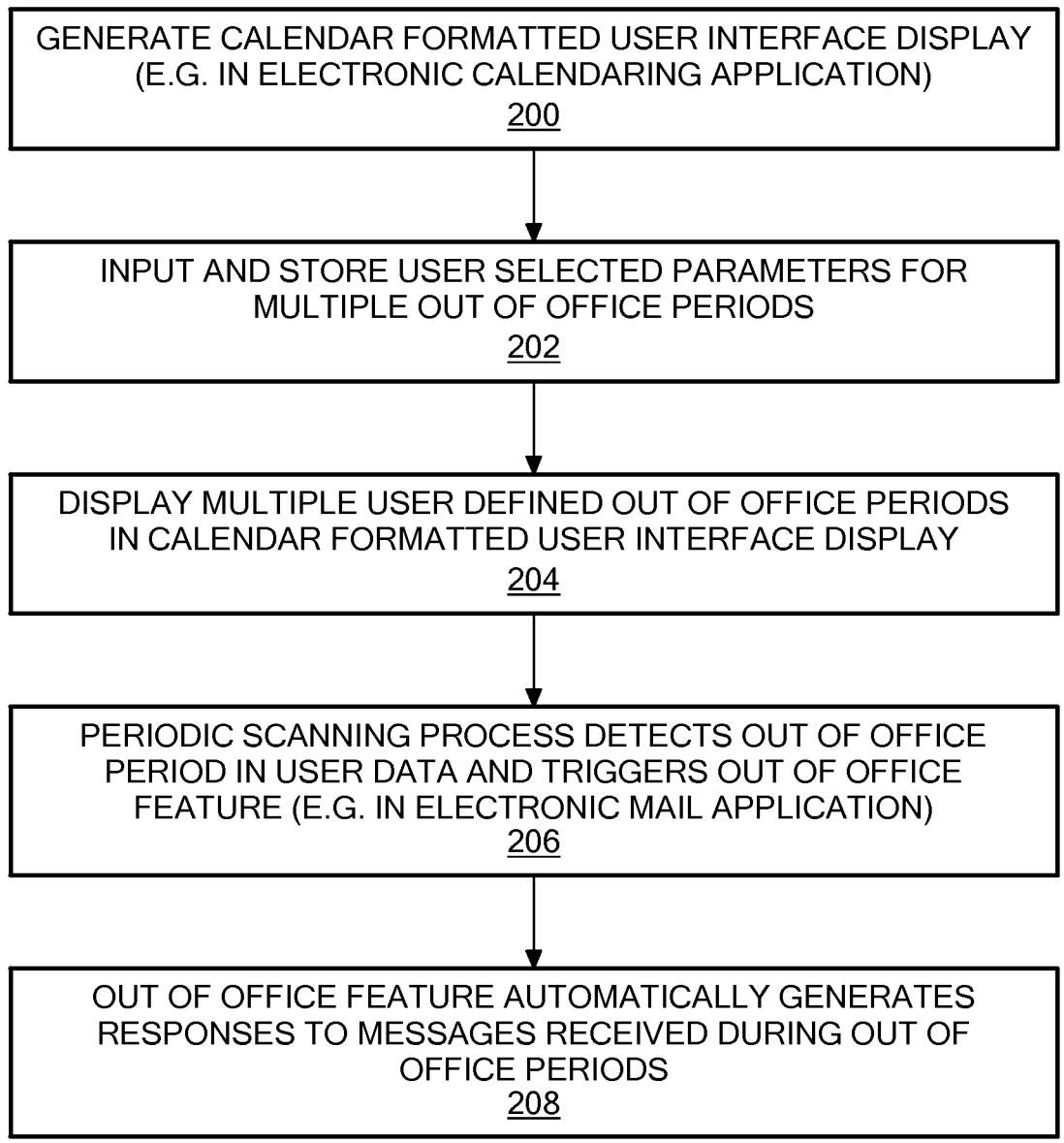
FIG. 5 is a flow chart showing an example of steps performed during operation of an illustrative embodiment of the disclosed system.

FIG. 5 is a flow chart showing steps performed during operation of an illustrative embodiment of the disclosed system. At step 200, the disclosed system generates a calendar formatted user interface display. At step 202, the disclosed system inputs and stores user selected parameter values for multiple out of office periods through the user interface display(s) generated in step 200. Such values may include a number of times one or more out of office periods should be repeated, indications that one or more out of office periods should be repeated indefinitely, and/or a time interval over which specific out of office periods should be repeated (e.g. weekly, monthly, yearly), e.g. as provided by the user through the user display object of FIG. 4. Each out of office period may be made up of any specific length of time from a user defined start time and date to a user defined end time and date (e.g. from noon to 5:00 pm within a single day, from noon on a first day through noon on another day, etc.).

In addition, the disclosed system may be embodied to allow the user to indicate that an out of office period is indefinite. In such an embodiment, the disclosed system presents an "Indefinite" user selectable graphic object (e.g. check box, button, etc.), for example within the User Interface Display 150 of FIG. 3. When selected in lieu of the user indicating a returning date and time (166 and 168 in FIG. 3), the "Indefinite" option causes the disclosed system to create an out of office entry that has an indefinite end time and date. Accordingly, the out of office period for the out of office entry does not end until it is expressly ended by the user when the user returns from being out of the office, e.g. by logging in and selecting an "End Out of Office Period" option or the like in a graphical user graphic object generated by the disclosed system. Once an out of office period with an indefinite end time and date begins, the disclosed system operates to provide automatically generated responses to electronic mail messages received for the user until the user expressly acts to end it.

At step 204, the disclosed system simultaneously displays multiple, previously defined out of office periods as calendar entries in a calendar formatted user interface display. A periodic scanning process or the like operates at step 206 to detect out of office periods in the stored user data and to trigger the out of office auto-response task or process with parameter values from corresponding out of office calendar entries. For example, at step 206 the periodic scanning process may operate at step 206 to trigger an out of office auto-response feature that is part of an electronic mail system. At step 208 the out of office feature or process triggered at step 206 automatically generates responses to electronic mail messages received for the user during the out of office periods defined by the out of office entries stored for the user in the user's electronic calendar data.

While the above description regarding illustrative embodiments of the disclosed system includes examples of specific user interface operations and/or display objects, including a date and time picker type of user interface that allows the user to select beginning and end dates and times for the disclosed out of office period electronic calendar entries, and a dialog box for indicating out of office repeat parameter values, the disclosed system is not limited to these specific embodiments. Accordingly, the user interface objects provided herein may be modified as appropriate for various alternative embodiments, using various specific configurations of graphical buttons, menus, dialog boxes, and the like. Those skilled in the art will accordingly recognize that alternative embodiments may use any specific type or kind of user interface display object that may be appropriate to provide the specific operations described.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); and/or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

We claim:

1. A method for providing out of office auto-response messages, comprising:

generating, in a user interface display device, an electronic calendaring user interface through which multiple out of office calendar entries can be managed as a specific type of calendar entry, and wherein said electronic calendaring user interface includes a calendar entry type selection display component through which a user can select an out of office period type of calendar entry from among multiple calendar entry types;

a start time and date user interface display component through which said user can select start times and dates for multiple out of office periods defined by corresponding entries of said out of office electronic calendar entries, an end time and date user interface display component through which said user can select an end time and date for said multiple out of office periods defined by said out of office electronic calendar entries, and a repeat out of office calendar entry user interface display component through which said user can select a number of times each of said out of office electronic calendar entries is to be repeated;

storing each of said out of office electronic calendar entries into a database;

monitoring said out of office electronic calendar entries stored in said database by a busy time task, wherein said monitoring includes periodically scanning said database, said busy time task further receiving notifications of updates to said database;

responsive to subsequently detecting, by said busy time task, that one of said multiple out of office periods defined by said out of office calendar entries in said database begins on a respective day, calling an out of office server application programming interface on said respective day;

starting, by said out of office server application programming interface, an out of office auto-responder for said one of said multiple out of office periods that begin on said respective day, said out of office responder automatically generating response messages to electronic mail messages received during said one of said multiple out of office periods that begins on said respective day; and automatically turning off, by an electronic mail system, said out of office auto-responder at the end of said one of said multiple out of office periods that beings on said respective day without intervention by said busy time task.

2. The method of claim 1, wherein said electronic calendaring user interface further includes a calendar-formatted portion within which said multiple out of office calendar entries are simultaneously displayed to said user.

3. The method of claim 2, wherein said calendar-formatted portion displays calendar event information for a time period spanning multiple months.

4. The method of claim 3, wherein said repeat out of office calendar entry user interface display component enables said user to define a repeat interval for each of said out of office electronic calendar entries.

5. The method of claim 4, wherein said repeat interval is user selectable from the set consisting of a day, a week, a month, and a year.

6. The method of claim 5, wherein said multiple out of office calendar entries further comprise a plurality of out of office calendar entries that are not repeated.

7. The method of claim 6, wherein at least one of said out of office calendar entries defines an out of office period that is a partial day.

8. The method of claim 7, wherein at least one of said out of office calendar entries defines an out of office period having an indefinite end time and date.

9. The method of claim 8, further comprising automatically generating response messages to electronic mail messages received during said out of office period having said indefinite end time and date until said user expressly ends said out of office period having said indefinite end time and date.

10. A computer system including a user interface display device, at least one processor, and memory for storing program code executable on said at least one processor, said memory having executable program code stored thereon that, when executed, causes said computer system to generate out of office auto-response messages for a user during multiple out of office periods, said program code comprising:

program code for generating, in a user interface display device, an electronic calendaring user interface through which multiple out of office calendar entries can be managed as a specific type of calendar entry, and wherein said electronic calendaring user interface includes a calendar entry type selection display component through which said user can select an out of office period type of calendar entry from among multiple calendar entry types;

a start time and date user interface display component through which said user can select start times and dates for multiple out of office periods defined by corresponding entries of said out of office electronic calendar entries, an end time and date user interface display component through which said user can select an end time and date for said multiple out of office periods defined by said out of office electronic calendar entries, and a repeat out of office calendar entry user interface display component through which said user can select a number of times each of said out of office electronic calendar entries is to be repeated;

program code for storing each of said out of office electronic calendar entries into a database;

program code for monitoring said out of office electronic calendar entries stored in said database by a busy time task, wherein said monitoring includes periodically scanning said database, said busy time task further receiving notifications of updates to said database;

program code for, responsive to subsequently detecting, by said busy time task, that one of said multiple out of office periods defined by said out of office calendar entries in said database begins on a respective day, calling an out of office server application programming interface on said respective day;

program code for starting, by said out of office server application programming interface, an out of office auto-responder for said one of said multiple out of office periods that begin on said respective day, said out of office responder automatically generating response messages to electronic mail messages received during said one of said multiple out of office periods that begins on said respective day;

program code for automatically turning off, by an electronic mail system, said out of office auto-responder at the end of said one of said multiple out of office periods that begins on said respective day without intervention by said busy time task.

11. The system of claim 10, wherein said electronic calendaring user interface further includes a calendar-formatted portion within which said multiple out of office calendar entries are simultaneously displayed to said user.

12. The system of claim 11, wherein said calendar-formatted portion displays calendar event information for a time period spanning multiple months.

13. The system of claim 12, wherein said repeat out of office calendar entry user interface display component enables said user to define a repeat interval for each of said out of office electronic calendar entries.

14. The system of claim 13, wherein said repeat interval is user selectable from the set consisting of a day, a week, a month, and a year.

15. The system of claim 14, wherein said multiple out of office calendar entries further comprise a plurality of out of office calendar entries that are not repeated.

16. The system of claim 15, wherein at least one of said out of office calendar entries defines an out of office period that is a partial day.

17. The system of claim 16, wherein at least one of said out of office calendar entries defines an out of office period having an indefinite end time and date.

18. The system of claim 17, further comprising program code for automatically generating response messages to electronic mail messages received during said out of office period having said indefinite end time and date until said user expressly ends said out of office period having said indefinite end time and date.

19. A computer program product including a computer readable medium having program code stored thereon that, when executed, causes a computer system to generate out of office auto-response messages for a user during multiple out of office periods, said program code comprising:

program code for generating, in a user interface display device, an electronic calendaring user interface through which multiple out of office calendar entries can be managed as a specific type of calendar entry, and wherein said electronic calendaring user interface includes
- a calendar entry type selection display component through which said user can select an out of office period type of calendar entry from among multiple calendar entry types;
- a start time and date user interface display component through which said user can select start times and dates for multiple out of office periods defined by corresponding entries of said out of office electronic calendar entries,
- an end time and date user interface display component through which said user can select an end time and date for said multiple out of office periods defined by said out of office electronic calendar entries, and
- a repeat out of office calendar entry user interface display component through which said user can select a number of times each of said out of office electronic calendar entries is to be repeated;

program code for storing each of said out of office electronic calendar entries into a database;

program code for monitoring said out of office electronic calendar entries stored in said database by a busy time task, wherein said monitoring includes periodically scanning said database, said busy time task further receiving notifications of updates to said database;

program code for, responsive to subsequently detecting, by said busy time task, that one of said multiple out of office periods defined by said out of office calendar entries in said database begins on a respective day, calling an out of office server application programming interface on said respective day;

program code for starting, by said out of office server application programming interface, an out of office auto-responder for said one of said multiple out of office periods that begins on said respective day, said out of office responder automatically generating response messages to electronic mail messages received during said one of said multiple out of office periods that begins on said respective day; and program code for automatically turning off, by an electronic mail system, said out of office auto-responder at the end of said one of said multiple out of office periods that begins on said respective day without intervention by said busy time task.

* * * * *